UNITED STATES PATENT OFFICE.

CLAUDE A. O. ROSELL, OF NEW YORK, N. Y., ASSIGNOR TO THE AMERICAN LITHOGRAPHIC COMPANY, OF NEW YORK.

PRINTING-SURFACE.

SPECIFICATION forming part of Reissued Letters Patent No. 11,819, dated April 10, 1900.

Original No. 637,554, dated November 21, 1899. Application for reissue filed December 22, 1899. Serial No. 741,345.

*To all whom it may concern:*

Be it known that I, CLAUDE A. O. ROSELL, a citizen of the United States, and a resident of the city, county, and State of New York, have invented certain new and useful Improvements in Printing-Surfaces, of which the following is a specification.

The invention relates to planographic printing, and has especial reference to the character of the printing form or device to be used in such planographic printing; and it consists of the improved apparatus herein shown and claimed.

The invention has especial applicability and usefulness in connection with rounded or cylindrical printing-forms and will be more especially described in that connection. More particularly it has in view the repeated renewal of a given planographic-printing form or device with a new fresh printing-surface after each printing job or edition is completed, and this repeated renewal of the surface without creating undulations or unevenness therein and while accurately maintaining the special shape, size, diameter, &c., of the printing-form.

In planographic cylinder-printing two methods have been used or suggested. In one a thin flexible sheet of aluminium or zinc is bent around a cylinder and is fastened there in place by suitable mechanical means, and the printing is effected from such sheet so cylindrically held and supported. In the other zinc is electrolytically deposited upon a cylinder of copper and the printing is effected from the zinc surfaces thus deposited. In the former case the mechanical incidents and difficulties accompanying the application and holding of the flexible sheets, as well as the expense of preparing the faces of those sheets for printing purposes, as by sand-blasting, have constituted serious obstacles in the way of extended use. In the latter case after the edition has been printed the effort has been made to remove the zinc printing-surface by means of nitric acid; but the nitric acid in this operation has the disadvantage of removing also a notable amount of copper, thereby gradually diminishing the diameter of the copper cylinder and, moreover, diminishing it unevenly, a feature which interferes with and prevents the uniform taking of ink and water from the ink and water rollers, respectively, and the uniform printing of the same. Moreover, any notable diminution in the diameter of the printing-cylinder would interfere with and prevent the proper coöperation of that cylinder with the other parts of the printing-press, and register would be gradually interfered with and finally rendered impossible to obtain without the reconstruction of the entire press. These difficulties are overcome in the following manner:

In the preferred form of my invention I prepare a cylinder of aluminium sufficiently strong to stand the pressure of printing or a cylindrical shell of aluminium supported upon an interior mandrel of iron or copper or any suitable metallic base the outer surface of which is aluminium. This cylinder or base having this outer surface of aluminium is finished with great accuracy and care with respect to uniformity of surface, exactness of dimensions, &c., all with reference to the exact shape and size of printing-form desired in the press. To increase its protective action, the aluminium is preferably burnished. Upon this surface I then deposit electrolytically an outer coating or face of zinc in such way as, while causing such zinc surface to be an integral part of the composite form, shall at the same time render it sufficiently porous and of the necessary surface character to adapt it to act as a lithographic or planographic printing surface. In order to achieve this result and to secure a zinc surface that will properly adhere to or integrate with the aluminium surface and be of the proper porous character for planographic printing, I electrodeposit the zinc from a solution of a zinc salt and an ammonium salt made basic by the addition of ammonia or from a solution of a zinc salt and aluminium salt and an ammonium salt made basic by the addition of ammonia. For this purpose a solution of zinc sulfate, aluminium sulfate, ammonium sulfate, and ammonia has been found satisfactory. A solution containing three per cent. of zinc sulfate and an equal amount of aluminium sulfate and of ammonium sulfate will be found suitable. The deposit of the zinc should be made by a low current. A current strength of from one-quarter to one-half an ampere per square foot would be suitable. In the above solutions the ammonia should not be added in quantity sufficient to form a permanent precipitate. If to a solution of a zinc salt ammonia is added until the solution becomes alkaline to litmus-paper and the precipitate at first formed is redissolved, the electrodeposited zinc will not adhere to the aluminium plate. The above-described process by which an electrolytically-deposited surface of zinc upon aluminium is obtained is not specifically claimed in this application, but is reserved for and forms the subject-matter of a separate application filed by me in the United States Patent Office on the 17th day of May, 1899, Serial No. 717,237. After the planographic zinc surface has been suitably applied the plate is at once ready to receive a transfer after the lithographic manner and to be suitably developed into a printing-surface by the process of etching familiar in that art—as, for example, by the use of a weak solution of gum-arabic and phosphoric acid—and to be thereupon used as a planographic-printing surface in a press containing both inking and dampening devices. After the use of the printing-form for printing purposes and the removal of the ink of the transfer in the usual way, as with turpentine, &c., the entire zinc coating is removed by means of suitable dilute nitric acid. By this operation the aluminium protective surface will be exposed, but without being in any way substantially affected or modified or itself removed and will be immediately ready to receive a second deposit of zinc for a second printing operation or edition. Care should be taken not to employ nitric acid that is very strong, for such acid would have some slight action upon the aluminium, although even then the action would be insignificant as compared with the action upon copper, and so would be practically negligible. Dilute nitric acid will be found suitable for removing the zinc, and it will have substantially no action upon the aluminium, so that the aluminium cylinder will last indefinitely long. Thus the printing-form consists of an outer coating or face of electrolytically-deposited zinc and suitable for planographic printing, but adapted to be wholly removed by a suitable reagent after the printing of one job is finished, and a base of suitable material integral with the outer printing-coating, the base having a protective face or coating of aluminium underlying the printing-coating. In this way and by the application of an even printing-surface of uniform and predetermined thickness the resulting printing form or device as a whole is always and permanently of the same shape and size, thus fitting it to coöperate permanently with the other parts of the printing-press. Moreover, as all the wear of the printing operation is on the outer coating or face, which is wholly removed and a new fresh coating or face applied for each new printing job, a printing-cylinder prepared as above described is practically indestructible.

Although specifically described with reference to cylinder-printing, where the invention has peculiar usefulness and advantages, and especially in connection with multicolor cylinder-printing, it nevertheless applies equally well to printing from flat or curved surfaces of any shape.

What I claim as new, and desire to secure by Letters Patent, is—

1. A lithographic-printing form composed of a metallic base, a protective coating thereon of aluminium, the base with said protective coating being as a whole of non-varying shape and dimensions, thus permanently adapting the printing-form as a whole to the coöperating parts of the press, and an outer planographic-printing surface of electrolytically-deposited zinc, said surface having a design upon it suitably developed and being thereby adapted to print lithographically, the surface being also adapted to be thereafter wholly removed by a suitable reagent not acting on the protective coating, the base, the protective coating and the printing-surface being all integrally united together substantially as described.

2. A lithographic-printing form composed of a metallic base, a burnished protective coating thereon of aluminium, the base with said protective coating being as a whole of non-varying shape and dimensions, thus permanently adapting the printing-form as a whole to the coöperating parts of the press, and an outer planographic-printing surface of electrolytically-deposited zinc, said surface having a design upon it suitably developed and being thereby adapted to print lithographically, the surface being also adapted to be thereafter wholly removed by a suitable reagent not acting on the protective coating, the base, the protective coating and the printing-surface being all integrally united together substantially as described.

3. A cylindrical lithographic-printing form composed of a metallic base, a protective coating thereon of aluminium, the base with said protective coating being as a whole of non-varying shape and dimensions, thus permanently adapting the printing-form as a whole to the coöperating parts of the press, and an outer planographic-printing surface of electrolytically-deposited zinc, said surface having a design upon it suitably developed and being thereby adapted to print lithographically, the surface being also adapted to be thereafter wholly removed by a suitable reagent not acting on the protective coating, the base, the protective coating and the printing-surface being all integrally united together substantially as described.

4. A cylindrical lithographic-printing form composed of a metallic base, a burnished protective coating thereon of aluminium, the base with said protective coating being as a whole of non-varying shape and dimensions, thus permanently adapting the printing-form as a whole to the coöperating parts of the press, and an outer planographic-printing surface of electrolytically-deposited zinc, said surface having a design upon it suitably developed and being thereby adapted to print lithographically, the surface being also adapted to be thereafter wholly removed by a suitable reagent not acting on the protective coating, the base, the protective coating and the printing-surface being all integrally united together substantially as described.

5. A cylindrical lithographic-printing form composed of a metallic base of copper, a protective coating thereon of aluminium, the base with said protective coating being as a whole of non-varying shape and dimensions, thus permanently adapting the printing-form as a whole to the coöperating parts of the press, and an outer planographic-printing surface of electrolytically-deposited zinc, said surface having a design upon it suitably developed and being thereby adapted to print lithographically, the surface being also adapted to be thereafter wholly removed by a suitable reagent not acting on the protective coating, the base, the protective coating and the printing-surface being all integrally united together substantially as described.

6. A cylindrical lithographic-printing form composed of a metallic base of copper, a burnished protective coating thereon of aluminium, the base with said protective coating being as a whole of non-varying shape and dimensions, thus permanently adapting the printing-form as a whole to the coöperating parts of the press, and an outer planographic-printing surface of electrolytically-deposited zinc, said surface having a design upon it suitably developed and being thereby adapted to print lithographically, the surface being also adapted to be thereafter wholly removed by a suitable reagent not acting on the protective coating, the base, the protective coating and the printing-surface being all integrally united together substantially as described.

7. A lithographic-printing form composed of a metallic base, a protective coating thereon of aluminium, the base with said protective coating being as a whole of non-varying shape and dimensions, thus permanently adapting the printing-form as a whole to the coöperating parts of the press, and an outer planographic-printing surface having a design upon it suitably developed and being thereby adapted to print lithographically, the surface being also adapted to be thereafter wholly removed by a suitable reagent not acting on the protective coating, the base, the protective coating and the printing-surface being all integrally united together substantially as described.

8. A lithographic-printing form composed of a metallic base, a protective coating thereon of aluminium, the base with said protective coating being as a whole of non-varying shape and dimensions, thus permanently adapting the printing-form as a whole to the coöperating parts of the press, and an outer planographic-printing surface of electrolytically-deposited metal, said surface having a design upon it suitably developed and being thereby adapted to print lithographically, the surface being also adapted to be thereafter wholly removed by a suitable reagent not acting on the protective coating, the base, the protective coating and the printing-surface being all integrally united together substantially as described.

9. A lithographic-printing form comprising an aluminium protective face of non-varying shape and an outer planographic-printing surface, said surface having a design upon it suitably developed and being thereby adapted to print lithographically, said surface being also adapted to be thereafter wholly removed by a suitable reagent not acting on the protective face, the protective face and the printing-surface being integrally united together, substantially as described.

10. A lithographic-printing form comprising an aluminium protective face of non-varying shape and an outer planographic-printing surface of electrolytically-deposited metal, said surface having a design upon it suitably developed and being thereby adapted to print lithographically, said surface being also adapted to be thereafter wholly removed by a suitable reagent not acting on the protective face, the protective face and the printing-surface being integrally united together, substantially as described.

11. A lithographic-printing form comprising an aluminium protective face of non-varying shape and an outer planographic-printing surface of electrolytically-deposited zinc, said surface having a design upon it suitably developed and being thereby adapted to print lithographically, said surface being also adapted to be thereafter wholly removed by a suitable reagent not acting on the protective face, the protective face and the printing-surface being integrally united together, substantially as described.

In testimony whereof I have signed my name to this specification in the presence of two subscribing witnesses.

CLAUDE A. O. ROSELL.

Witnesses;
EDWIN SEGER,
SIDNEY MANN.